Figure 1:
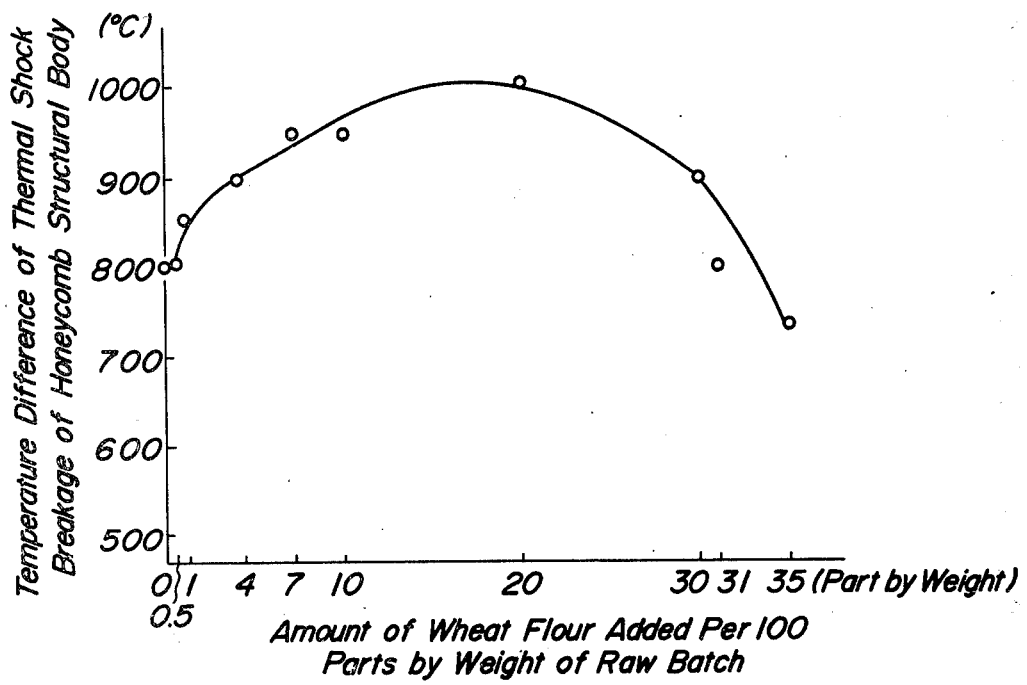

United States Patent [19]

Ogawa et al.

[11] 4,279,849
[45] Jul. 21, 1981

[54] METHOD FOR PRODUCING CORDIERITE CERAMIC HONEYCOMB STRUCTURAL BODIES

[75] Inventors: Yutaka Ogawa, Nagoya; Toshio Takehara, Kagamihara; Seiichi Asami, Okazaki, all of Japan

[73] Assignee: NGK Insulators, Inc., Nagoya, Japan

[21] Appl. No.: 112,325

[22] Filed: Jan. 15, 1980

[30] Foreign Application Priority Data

Jan. 25, 1979 [JP] Japan .................................. 54/7587

[51] Int. Cl.³ ............................................ C04B 35/64
[52] U.S. Cl. ........................................ 264/63; 51/309
[58] Field of Search ............................ 264/63; 51/309

[56] References Cited

U.S. PATENT DOCUMENTS

| 3,079,243 | 2/1963 | Ueltz | 51/298 |
| 3,183,071 | 5/1965 | Rue et al. | 51/309 |
| 3,428,443 | 2/1969 | Davis | 264/63 |
| 3,518,756 | 7/1970 | Bennett et al. | 264/63 |
| 3,963,504 | 6/1976 | Lundsager | 264/63 |

Primary Examiner—Donald E. Czaja
Assistant Examiner—W. Thompson
Attorney, Agent, or Firm—Stevens, Davis, Miller & Mosher

[57] ABSTRACT

Cordierite ceramic honeycomb structural bodies having a high thermal shock resistance and a high water absorption are produced by adding the defined amount of starch powder, a binder and water to a ceramic starting material to crystallize cordierite upon firing.

2 Claims, 3 Drawing Figures

METHOD FOR PRODUCING CORDIERITE CERAMIC HONEYCOMB STRUCTURAL BODIES

The present invention relates to a method for producing cordierite ceramic honeycomb structural bodies for supporting catalyst for purifying harmful gases, such as automotive exhaust gas, factory exhaust gas and the like.

The prior methods for producing cordierite ceramic honeycomb structural bodies comprise adding a binder, such as starch paste, methyl cellulose, polyvinyl alcohol and the like and water to ceramic starting material to crystallize cordierite when firing, kneading the resulting mixture, extruding the mixture and then drying and firing the shaped article, or adding 1 to 30 parts by weight of graphite or carbon powder for increasing the water absorption to make supporting of catalyst easy to 100 parts by weight of ceramic starting materials to crystallize cordierite when firing, and a binder such as starch paste, methyl cellulose, polyvinyl alcohol and the like and water, kneading the resulting mixture, extruding the mixture and drying and firing the shaped article. The starch paste used in the prior methods acts a role of a molding assistant and in order to provide a bonding force between ceramic starting material powders, only gelatinized starch obtained by heating starch powder in water is used.

These methods have the following defects. When powdery graphite or powdery carbon is not added, it is impossible to freely control the increase of the water absorption of the fired body. When powdery graphite or powdery carbon is added, even though the water absorption can be freely controlled by selection of the amount of additives, the thermal shock resistance of the honeycomb structural body produced by this production process is low, so that the honeycomb structural body is apt to be broken by, for example, rapid heating upon starting of automobile engines.

The present invention aims to solve these defects and provide means capable of controlling the water absorption and improving the thermal shock resistance, and consists in a method for producing cordierite ceramic honeycomb structural bodies, which comprises adding a binder, water and 1 to 30 parts by weight of starch powder to 100 parts by weight of ceramic starting material to crystallize cordierite by firing, kneading the resulting mixture, extruding the mixture and then drying and firing the shaped article.

The ceramic starting material to crystallize cordierite when firing is a mixture obtained by compounding starting materials to have magnesia, alumina and silica so that the major part of the fired product is constituted with cordierite crystal and the chemical composition of the fired product is 46 to 53% by weight of $SiO_2$, 31 to 41% by weight of $Al_2O_3$, 11 to 16% by weight of MgO and less than 3% by weight of inevitable impurities as the optimum range. As starch powder to be used as pore forming agent, use may be made of wheat flour, rice flour, potato flour, corn flour and the like, in which starch component has not been gelatinized. The grain size range of starch powder to be used is 0.005 to 0.08 mm, preferably 0.02 to 0.04 mm in the average grain size but the grain size is not limited thereto. The binder includes starch paste, methyl cellulose, polyvinyl alcohol and the like, which have been heretofore been used. The mixing and kneading and extruding are carried out through an apparatus wherein a die disclosed in U.S. Pat. No. 3,824,196, by which the extruded material is shaped into a honeycomb structure, is provided to a de-airing pug mill or a piston type extruder. The temperature of the green mass itself during kneading must be not higher than 70° C. and for the purpose, the kneader is cooled. The firing is conducted at the temperature heretofore known for crystallizing cordierite crystal, for example, at a temperature of 1,330° to 1,450° C. for 2 to 6 hours.

Figure 2:
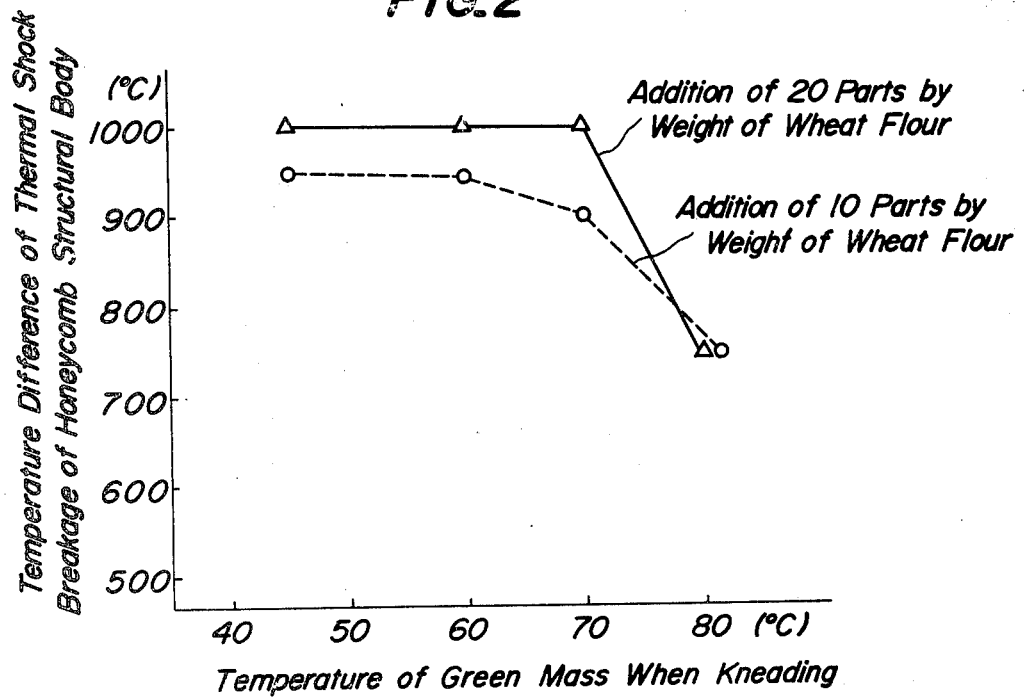

The reason why the ungelatinized starch powder must be added in the production method of the present invention, is as follows. When the ungelatinized starch powder is used, the starch powder is burnt to form pores and form a porous body having a high water absorption and in the porous portion are readily held inorganic substances having a large specific surface area, such as γ-alumina, which are applied as a pretreatment for supporting a catalyst and a large amount of catalyst is supported in a material such as γ-alumina and deposited and the catalytic function can be fully developed and the thermal shock resistance of the honeycomb structural body becomes very higher. An additional reason why the ungelatinized starch powder is used, is that when starch has been gelatinized, starch becomes water soluble, so that when shaping, the starch cannot occupy the positions where will form distinct pores afterwards and it is impossible to obtain the desired water absorption. The limitation of the amount of the starch powder to 1 to 30 parts by weight is based on the following reason. As shown in FIG. 1, in the curve showing the relation of the temperature difference of thermal shock breakage to the amount of starch added of the honeycomb structural body produced by the production method of the present invention, the thermal shock resistance when not less than 1% by weight of starch powder is added, becomes noticeably larger than that of the conventional method wherein no starch powder is added and the thermal shock resistance gradually increases with increase of the addition amount of starch powder, while when said amount exceeds 30 parts by weight, the thermal shock resistance becomes suddenly lower. Since the thermal shock resistance of the product produced by adding 1 to 30% by weight of starch powder becomes higher, it is possible to rapidly raise the temperature of the honeycomb structural body and the reaction of the catalyst at a high temperature can start in a short time after starting the engine and the exhaust of the harmful gas upon starting the engine of automobile can be prevented. And the honeycomb structural body is scarcely cracked and therefore is durable for a long period of time. Furthermore, in the product obtained by adding 20 parts by weight of starch powder, the fine pore volume is about two times that of the product obtained by adding no starch powder according to the prior process, so that the ability for purifying the exhaust gas of the present invention is higher than that of the prior art. The reason why the temperature of the green mass when extruding in the production method of the present invention is not higher than 70° C., is as follows. When the temperature exceeds 70° C., the starch powder reacts with water to cause gelatinization and as mentioned above, it is not only impossible to obtain the desired water absorption after firing but also the starch powder becomes sticky and has the property acting as a binder resulting into addition of an excessive amount of binder, so that the honeycomb structural body gradually deforms immediately after extrusion and it is difficult to obtain the shaped article having excellent precise dimension. In addition, if the temperature exceeds 70° C., small cracks are liable to be formed at the wall portion of the honeycomb structural body and as shown in FIG. 2, the thermal shock resistance becomes suddenly lower.

Figure 3:
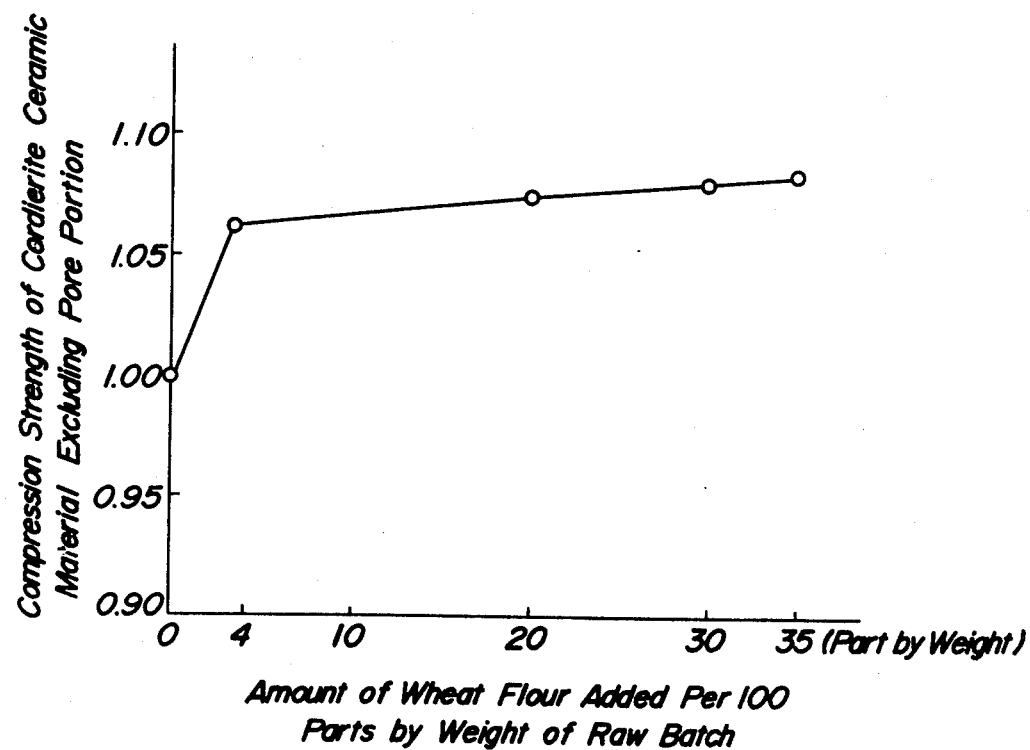

The mechanism why the thermal shock resistance of the honeycomb structural body is noticeably increased by addition of starch according to the present invention, has not yet been clarified but the results as shown in FIG. 3 is obtained in the following measurement. That is, a part of the mixed and kneaded green mass was charged into an extruder not provided with a die for shaping a honeycomb structural body into a rod having a diameter of 12 mm, the formed rod was cut into a length of 10 mm, the cut piece was dried and fired to obtain a sample. This sample was photographed at the cross-section perpendicular to the axial direction at an enlarging magnification of 250 times and an area of the pore portion was measured with the eye with respect to this photograph and the measured area is subtracted from the cross-sectional area of said sample to calculate the area occupied with the cordierite ceramic material. Then, a compression force was applied in the axial direction of the sample to determine the value at which the sample was fractured. Then, this value was divided by the area occupied with the cordierite ceramic material and the calculated value was referred to as the compression strength (ratio compared with the strength (1.00) when no starch powder is added) of the cordierite ceramic material itself excluding the pore portion. The measured strength increases owing to the addition of starch powder. It seems that this is the cause of improving of the thermal shock resistance of the honeycomb structural body. It is not clear what reaction occurs in the cordierite ceramic materials due to the addition of starch powder, such as wheat flour and what structure is formed and improves the strength. The reason why when the amount of starch powder added exceeds 30 parts by weight, the thermal shock resistance lowers, is presumably as follows. The total fine pore volume increases because of increase of the burnt substance and the strength of the material constituting the honeycomb structural body lowers, even if the above described strength is increased.

The temperature difference of the thermal shock breakage of the best honeycomb structural body produced by a conventional process wherein powdery graphite or powdery carbon is added, is 800° C., while the temperature difference of the thermal shock breakage of the honeycomb structural body obtained by the production method of the present invention is 900° to 1,000° C. as shown in FIG. 1 and is higher than that of the conventional product, so that the present invention has particularly excellent effect for preventing the public nuisance and improvement of durability of the honeycomb structural body, and is excellent in the lubricating ability, so that the abrasion amount of the extrusion die of the extruder in the present invention is about half that in the prior art and the durability of the die is longer and the product having a high dimension preciseness can be always obtained.

The process for measuring the temperature difference of thermal shock breakage in FIGS. 1 and 2 was made as follows. Four honeycomb structural bodies were put on a refractory plate, said plate was put in an electric furnace kept at a given temperature, held for 30 minutes therein and then taken out of the furnace to an outside at room temperature and left to stand, and when the sample was completely cooled, the sample was put in the electric furnace. This operation was repeated three times and then the sample was observed with eye whether there are cracks or not and the case where two or more samples were not cracked among four samples was referred to as "pass". Then, these samples were put in the furnace in which the temperature was 50° C. higher than the former test and the same operation was repeated and this test was continued until cracks are formed in two or more samples among four samples and the temperature difference of the temperature in the electric furnace at which cracks were observed in two or more samples among four samples, from room temperature was referred to as "temperature difference of thermal shock breakage".

The present invention will be explained in more detail.

For a better understanding of the invention, reference is taken to the accompanying drawings, wherein:

FIG. 1 is a diagrammatical view showing the relation of the amount of wheat flour added to the temperature difference of thermal shock breakage of the honeycomb structural body;

FIG. 2 is a diagrammatical view showing the relation of the temperature of the green mass when kneading to the temperature difference of thermal shock breakage of the honeycomb structural body; and FIG. 3 is a diagrammatical view showing the relation of the compression strength of cordierite ceramic material excluding pore portion to the amount of wheat flour added per 100 parts by weight of raw batch.

The following examples are given for the purpose of illustration of this invention and are not intended as limitations thereof.

To the compositions shown in the following Table were added starch paste and water and the resulting mixture was kneaded while cooling the mixture so that the temperature of the green mass itself was lower than 65° C. and the kneaded green mass was extruded into a honeycomb having a diameter of 90 mm and a length of 110 mm, and the shaped honeycomb was dried and fired. The physical properties and thermal shock resistance of the fired products were measured and the obtained results are shown in the following Table.

TABLE 1(a)

| Example No. | 1 | 2 | 3 | 4 | 5 | Comparative; prior process |
|---|---|---|---|---|---|---|
| Chemical component (wt.%) | | | | | | |
| $SiO_2$ | 50.4 | 50.8 | 48.7 | 48.7 | 49.5 | 50.8 |
| $Al_2O_3$ | 34.0 | 33.9 | 36.2 | 36.2 | 35.1 | 33.8 |
| MgO | 13.9 | 13.3 | 13.8 | 13.8 | 13.4 | 13.8 |
| Impurity | 1.7 | 2.0 | 1.3 | 1.3 | 2.0 | 1.6 |
| Total amount | 100.0 | 100.0 | 100.0 | 100.0 | 100.0 | 100.0 |
| Talc | 15.2 | 23.0 | 18.0 | 18.0 | 27.8 | 21.5 |
| Calcined talc | 24.0 | 14.0 | 21.0 | 21.0 | 9.8 | 19.3 |
| Kaolin | 10.8 | 19.0 | 2.7 | 2.7 | 25.6 | 6.0 |
| Calcined kaolin | 24.2 | 21.4 | 30.3 | 30.3 | 15.6 | 30.0 |
| Ball-clay | 11.7 | 9.8 | 10.0 | 10.0 | 7.5 | 9.6 |
| Alumina | 14.1 | 12.8 | 18.0 | 18.0 | 13.7 | 13.6 |
| Total amount of ceramic starting materials | 100.0 | 100.0 | 100.0 | 100.0 | 100.0 | 100.0 |
| Wheat flour | 10.0 | 20.0 | 4.0 | 7.0 | — | Graphite powder |
| Rice flour | — | — | — | — | 4.0 | 15.0 |

TABLE 1(b)

| Example No. | | 1 | 2 | 3 | 4 | 5 | Comparative; prior process |
|---|---|---|---|---|---|---|---|
| Firing temperature (°C.) | | 1,400 | 1,400 | 1,410 | 1,410 | 1,390 | 1,390 |
| Soaking time (hour) | | 4 | 4 | 6 | 6 | 5 | 5 |
| Thermal expansion coefficient $\times 10^{-6}$/°C. (40 ~ 900° C.) | | 1.46 | 1.80 | 0.86 | 1.05 | 1.35 | 1.23 |
| Total pore volume (cm$^3$/g) | | 0.35 | 0.45 | 0.26 | 0.30 | 0.25 | 0.35 |
| Thermal shock resistance | Temperature difference from room temperature | | | | | | |
| (Broken number of four original samples) | 700° C. | 0 | 0 | 0 | 0 | 0 | 0 |
| | 750 | 0 | 0 | 0 | 0 | 0 | 1 |
| | 800 | 0 | 0 | 0 | 0 | 0 | 2 |
| | 850 | 0 | 0 | 1 | 0 | 2 | 4 |
| | 900 | 1 | 0 | 1 | 1 | 2 | — |
| | 950 | 2 | 1 | 2 | 2 | — | — |
| | 1,000 | 1 | 1 | — | 1 | — | — |

According to the above Table, in the honeycomb structural body produced by the prior method wherein powdery graphite was added, the breakage occurred at the thermal shock of the difference of 750° C., while the honeycomb structural bodies produced by the method of the present invention caused the breakage at the temperature difference of 850° C., in many cases 900° C., so that the product of the present invention was excellent at least 100° C. in the thermal shock resistance.

As mentioned above, the products according to the production method of the present invention remove the exhaust gas of automobiles more highly and the present invention improves the productivity, so that the present invention is commercially useful.

What is claimed is:

1. A method for producing cordierite ceramic honeycomb structural bodies having an excellent thermal shock resistance, which comprises adding a binder, water and 1 to 30 parts by weight of ungelatinized starch powder to 100 parts by weight of ceramic starting material to crystallize cordierite by firing, kneading the resulting mixture at a temperature of not higher than 70° C., extruding the mixture into a honeycomb structural body, and drying and firing the honeycomb structural body.

2. The method as claimed in claim 1, wherein the starch powder is at least one flour selected from the group consisting of wheat flour, rice flour, potato flour and corn flour.

* * * * *